(12) United States Patent
Bataineh et al.

(10) Patent No.: US 11,876,702 B2
(45) Date of Patent: Jan. 16, 2024

(54) SYSTEM AND METHOD FOR FACILITATING EFFICIENT ADDRESS TRANSLATION IN A NETWORK INTERFACE CONTROLLER (NIC)

(71) Applicant: Hewlett Packard Enterprise Development LP, Houston, TX (US)

(72) Inventors: Abdulla M. Bataineh, Vista, CA (US); Thomas L. Court, Three Lakes, WI (US); Hess M. Hodge, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 62 days.

(21) Appl. No.: 17/594,815

(22) PCT Filed: Mar. 23, 2020

(86) PCT No.: PCT/US2020/024271
§ 371 (c)(1),
(2) Date: Oct. 29, 2021

(87) PCT Pub. No.: WO2020/236290
PCT Pub. Date: Nov. 26, 2020

(65) Prior Publication Data
US 2022/0214975 A1 Jul. 7, 2022

Related U.S. Application Data

(60) Provisional application No. 62/852,273, filed on May 23, 2019, provisional application No. 62/852,203, (Continued)

(51) Int. Cl.
*G06F 13/14* (2006.01)
*H04L 45/02* (2022.01)
(Continued)

(52) U.S. Cl.
CPC .............. *H04L 45/02* (2013.01); *G06F 9/505* (2013.01); *G06F 9/546* (2013.01);
(Continued)

(58) Field of Classification Search
CPC ... H04L 45/28; H04L 1/0083; H04L 43/0876; H04L 43/10; H04L 45/021; H04L 45/028;
(Continued)

(56) References Cited

U.S. PATENT DOCUMENTS

| 4,807,118 A | 2/1989 | Lin et al. |
| 5,138,615 A | 8/1992 | Lamport et al. |

(Continued)

FOREIGN PATENT DOCUMENTS

| CN | 101729609 A | 6/2010 |
| CN | 102932203 A | 2/2013 |

(Continued)

OTHER PUBLICATIONS

International Search Report and Written Opinion received for PCT Application No. PCT/US2020/024271, dated Jul. 9, 2020, 10 pages.

(Continued)

*Primary Examiner* — Idriss N Alrobaye
*Assistant Examiner* — Richard B Franklin
(74) *Attorney, Agent, or Firm* — Yao Legal Services, Inc.

(57) ABSTRACT

A network interface controller (NIC) capable of facilitating efficient memory address translation is provided. The NIC can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available (Continued)

in the cache, the ATU can perform an operation on the memory address based on the operating mode.

16 Claims, 7 Drawing Sheets

Related U.S. Application Data filed on May 23, 2019, provisional application No. 62/852,289, filed on May 23, 2019.

(51) Int. Cl.

| | | |
|---|---|---|
| *H04L 45/028* | (2022.01) | |
| *H04L 45/125* | (2022.01) | |
| *H04L 45/00* | (2022.01) | |
| *H04L 45/122* | (2022.01) | |
| *H04L 47/76* | (2022.01) | |
| *H04L 49/15* | (2022.01) | |
| *H04L 49/00* | (2022.01) | |
| *H04L 69/40* | (2022.01) | |
| *H04L 47/10* | (2022.01) | |
| *H04L 49/9005* | (2022.01) | |
| *H04L 47/34* | (2022.01) | |
| *H04L 67/1097* | (2022.01) | |
| *G06F 13/16* | (2006.01) | |
| *H04L 45/021* | (2022.01) | |
| *H04L 47/12* | (2022.01) | |
| *G06F 13/42* | (2006.01) | |
| *H04L 47/2441* | (2022.01) | |
| *H04L 47/30* | (2022.01) | |
| *H04L 47/62* | (2022.01) | |
| *H04L 47/24* | (2022.01) | |
| *H04L 49/90* | (2022.01) | |
| *G06F 13/38* | (2006.01) | |
| *G06F 13/40* | (2006.01) | |
| *H04L 45/745* | (2022.01) | |
| *H04L 47/2483* | (2022.01) | |
| *H04L 47/629* | (2022.01) | |
| *H04L 47/80* | (2022.01) | |
| *H04L 49/101* | (2022.01) | |
| *H04L 45/12* | (2022.01) | |
| *H04L 47/122* | (2022.01) | |
| *G06F 12/1036* | (2016.01) | |
| *G06F 15/173* | (2006.01) | |
| *H04L 43/10* | (2022.01) | |
| *H04L 45/42* | (2022.01) | |
| *H04L 47/11* | (2022.01) | |
| *G06F 12/0862* | (2016.01) | |
| *G06F 12/1045* | (2016.01) | |
| *H04L 47/32* | (2022.01) | |
| *G06F 9/54* | (2006.01) | |
| *G06F 9/50* | (2006.01) | |
| *H04L 47/22* | (2022.01) | |
| *H04L 47/52* | (2022.01) | |
| *H04L 47/6275* | (2022.01) | |
| *H04L 45/24* | (2022.01) | |
| *H04L 45/7453* | (2022.01) | |
| *H04L 45/16* | (2022.01) | |
| *H04L 69/22* | (2022.01) | |
| *H04L 47/762* | (2022.01) | |
| *H04L 47/78* | (2022.01) | |
| *H04L 47/20* | (2022.01) | |
| *H04L 49/9047* | (2022.01) | |
| *H04L 1/00* | (2006.01) | |
| *H04L 43/0876* | (2022.01) | |
| *H04L 47/2466* | (2022.01) | |
| *H04L 47/625* | (2022.01) | |
| *H04L 69/28* | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/626* (2013.01); *H04L 47/629* (2013.01); *H04L 47/6235* (2013.01); *H04L 47/6275* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(58) Field of Classification Search
CPC ... H04L 45/122; H04L 45/123; H04L 45/125; H04L 45/16; H04L 45/20; H04L 45/22; H04L 45/24; H04L 45/38; H04L 45/42; H04L 45/46; H04L 45/566; H04L 45/70; H04L 45/745; H04L 45/7453; H04L 47/11; H04L 47/12; H04L 47/122; H04L 47/18; H04L 47/20; H04L 47/22; H04L 47/24; H04L 47/2441; H04L 47/2466; H04L 47/2483; H04L 47/30; H04L 47/32; H04L 47/323; H04L 47/34; H04L 47/39; H04L 47/52; H04L 47/621; H04L 47/6235; H04L 47/626; H04L 47/6275; H04L 47/629; H04L 47/76; H04L 47/762; H04L 47/781; H04L 47/80; H04L 49/101; H04L 49/15; H04L 49/30; H04L 49/3009; H04L 49/3018; H04L 49/3027; H04L 49/90; H04L 49/9005; H04L 49/9021; H04L 49/9036; H04L 49/9047; H04L 67/1097; H04L 69/22; H04L 69/40; H04L 69/28; G06F 9/505; G06F 9/546; G06F 12/0862; G06F 12/1036; G06F 12/1063; G06F 13/14; G06F 13/16; G06F 13/1642; G06F 13/1673; G06F 13/1689; G06F 13/385; G06F 13/4022; G06F 13/4068; G06F 13/4221; G06F 15/17331; G06F 2212/50; G06F 2213/0026; G06F 2213/3808

See application file for complete search history.

(56) References Cited

U.S. PATENT DOCUMENTS

| | | |
|---|---|---|
| 5,457,687 A | 10/1995 | Newman |
| 5,937,436 A * | 8/1999 | Watkins .............. G06F 12/1027 711/135 |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweva et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Mark |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 | 3/2015 | McCanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | McKelvie et al. |
| 10,169,060 B1 | 1/2019 | Mncent et al. |
| 10,178,035 B2 | 1/2019 | Dillon |
| 10,200,279 B1 | 1/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | MacNamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |

(56) References Cited

U.S. PATENT DOCUMENTS

| | | |
|---|---|---|
| 2005/0152274 A1 | 7/2005 | Simpson |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1* | 4/2008 | Moertl .............. G06F 12/1081 710/22 |
| 2008/0147881 A1 | 6/2008 | Krishnamurthy et al. |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | McDaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |

(56) References Cited

U.S. PATENT DOCUMENTS

| | | |
|---|---|---|
| 2016/0154756 A1 | 6/2016 | Dodson et al. |
| 2016/0182383 A1 | 6/2016 | Pedersen |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0177541 A1 | 6/2017 | Berman et al. |
| 2017/0220500 A1 | 8/2017 | Tong |
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | McKelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1 | 11/2020 | Caulfield et al. |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1 | 2/2023 | Sankaran et al. |
| 2023/0046221 A1 | 2/2023 | Pismenny et al. |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |

(56) References Cited

FOREIGN PATENT DOCUMENTS

| | | |
|---|---|---|
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |
| WO | 2018/046703 A1 | 3/2018 |
| WO | 2019/072072 A1 | 4/2019 |

OTHER PUBLICATIONS

International Search Report and Written Opinion received for PCT Patent Application No. PCT/US20/24340, dated Oct. 26, 2020, 9 pages.
International Search Report and Written Opinion received for PCT Patent Application No. PCT/US20/24342, dated Oct. 27, 2020, 10 pages.
International Search Report and Written Opinion received for PCT Patent Application No. PCT/US2020/024192, dated Oct. 23, 2020, 9 pages.
International Search Report and Written Opinion received for PCT Patent Application No. PCT/US2020/024221, dated Oct. 26, 2020, 9 pages.
International Search Report cited in PCT/US2020/024170 dated Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A.R., et al.; "Efficient Barrier and Allreduce on Infiniband clusters using multicast and adaptive algorithms"; Sep. 20-23, 2004; 10 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.
Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al; "Deadlock-Free Broadcast Routing in Dragonfly Networks without Virtual Channels", submission to IEEE transactions on Parallel and Distributed Systems, 2015, 15 pages.
Awerbuch, B., et al.; "An On-Demand Secure Routing Protocol Resilient to Byzantine Failures"; Sep. 2002; 10 pages.

Bhatele, A., et al.; "Analyzing Network Health and Congestion in Dragonfly-based Supercomputers"; May 23-27, 2016; 10 pages.
Blumrich, M.A., et al.; "Exploiting Idle Resources in a High-Radix Switch for Supplemental Storage"; Nov. 2018; 13 pages.
Chang, F., et al; "PVW: Designing Virtual World Server Infrastructure"; 2010; 8 pages.
Chen, F., et al.; "Requirements for RoCEv3 Congestion Management"; Mar. 21, 2019; 8 pages.
Cisco Packet Tracer; "packet-tracer;—ping"; https://www.cisco.com/c/en/us/td/docs/security/asa/asa-command-reference/I-R/cmdref2/p1.html; 2017.
Cisco; "Understanding Rapid Spanning Tree Protocol (802.1w)"; Aug. 1, 2017; 13 pages.
Eardley, Ed, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network For Data Centers"; Nov. 7, 2017; 15 pages.
International Search Report and Written Opinion received for PCT Application No. PCT/US2020/024248, dated Jul. 8, 2020, 11 pages.
International Search Report and Written Opinion received for PCT Application No. PCT/US20/024332, dated Jul. 8, 2020, 13 pages.
International Search Report and Written Opinion received for PCT Application No. PCT/US20/24243, dated Jul. 9, 2020, 10 pages.
International Search Report and Written Opinion received for PCT Application No. PCT/US20/24253, dated Jul. 6, 2020, 12 pages.
International Search Report and Written Opinion received for PCT Application No. PCT/US20/24256, dated Jul. 7, 2020, 11 pages.
International Search Report and Written Opinion received for PCT Application No. PCT/US20/24257, dated Jul. 7, 2020, 10 pages.
International Search Report and Written Opinion received for PCT Application No. PCT/US20/24258, dated Jul. 7, 2020, 9 pages.
International Search Report and Written Opinion received for PCT Application No. PCT/US20/24259, dated Jul. 9, 2020, 13 pages.
International Search Report and Written Opinion received for PCT Application No. PCT/US20/24260, dated Jul. 7, 2020, 11 pages.
International Search Report and Written Opinion received for PCT Application No. PCT/US20/24268, dated Jul. 9, 2020, 11 pages.
International Search Report and Written Opinion received for PCT Application No. PCT/US20/24269, dated Jul. 9, 2020, 11 pages.
International Search Report and Written Opinion received for PCT Application No. PCT/US20/24339, dated Jul. 8, 2020, 11 pages.
International Search Report and Written Opinion received for PCT Application No. PCT/US2020/024125, dated Jul. 10, 2020, 5 pages.
International Search Report and Written Opinion received for PCT Application No. PCT/US2020/024129, dated Jul. 10, 2020, 11 pages.
International Search Report and Written Opinion received for PCT Application No. PCT/US2020/024237, dated Jul. 14, 2020, 5 pages.
International Search Report and Written Opinion received for PCT Application No. PCT/US2020/024239, dated Jul. 14, 2020, 11 pages.
International Search Report and Written Opinion received for PCT Application No. PCT/US2020/024241, dated Jul. 14, 2020, 13 pages.
International Search Report and Written Opinion received for PCT Application No. PCT/US2020/024242, dated Jul. 6, 2020, 11 pages.
International Search Report and Written Opinion received for PCT Application No. PCT/US2020/024244, dated Jul. 13, 2020, 10 pages.
International Search Report and Written Opinion received for PCT Application No. PCT/US2020/024245, dated Jul. 14, 2020, 11 pages.
International Search Report and Written Opinion received for PCT Application No. PCT/US2020/024246, dated Jul. 14, 2020, 10 pages.

(56) References Cited

OTHER PUBLICATIONS

International Search Report and Written Opinion received for PCT Application No. PCT/US2020/024250, dated Jul. 14, 2020, 12 pages.
International Search Report and Written Opinion received for PCT Application No. PCT/US2020/024254, dated Jul. 13, 2020, 10 pages.
International Search Report and Written Opinion received for PCT Application No. PCT/US2020/024262, dated Jul. 13, 2020, 10 pages.
International Search Report and Written Opinion received for PCT Application No. PCT/US2020/024266, dated Jul. 9, 2020, 10 pages.
International Search Report and Written Opinion received for PCT Application No. PCT/US2020/024270, dated Jul. 10, 2020, 13 pages.
International Search Report and Written Opinion received for PCT Application No. PCT/US2020/024272, dated Jul. 9, 2020, 10 pages.
International Search Report and Written Opinion received for PCT Application No. PCT/US2020/024276, dated Jul. 13, 2020, 9 pages.
International Search Report and Written Opinion received for PCT Application No. PCT/US2020/024304, dated Jul. 15, 2020, 11 pages.
International Search Report and Written Opinion received for PCT Application No. PCT/US2020/024311, dated Jul. 17, 2020, 8 pages.
International Search Report and Written Opinion received for PCT Application No. PCT/US2020/024321, dated Jul. 9, 2020, 9 pages.
International Search Report and Written Opinion received for PCT Application No. PCT/US2020/024324, dated Jul. 14, 2020, 10 pages.
International Search Report and Written Opinion received for PCT Application No. PCT/US2020/024327, dated Jul. 10, 2020, 15 pages.
International Search Report and Written Opinion received for PCT Application No. PCT/US2020/24158, dated Jul. 6, 2020, 18 pages.
International Search Report and Written Opinion received for PCT Application No. PCT/US2020/24251, dated Jul. 6, 2020, 11 pages.
International Search Report and Written Opinion received for PCT Application No. PCT/US2020/24267, dated Jul. 6, 2020, 9 pages.
International Search Report and Written Opinion received for PCT Patent Application No. PCT/US20/24303, dated Oct. 21, 2020, 9 pages.
Ramakrishnan et al, RFC 3168, "The addition of Explicit Congestion Notification (ECN) to IP", Sep. 2001 (Year: 2001).
Extended European Search Report and Search Opinion received for EP Application No. 20809930.9, dated Mar. 2, 2023, 9 pages.
Extended European Search Report and Search Opinion received for EP Application No. 20810784.7, dated Mar. 9, 2023, 7 pages.

\* cited by examiner

SYSTEM AND METHOD FOR FACILITATING EFFICIENT ADDRESS TRANSLATION IN A NETWORK INTERFACE CONTROLLER (NIC)

BACKGROUND

Field

This is generally related to the technical field of networking. More specifically, this disclosure is related to systems and methods for facilitating a network interface controller (NIC) with efficient address translation management.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of facilitating efficient memory address translation is provided. The NIC can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available in the cache, the ATU can perform an operation on the memory address based on the operating mode.

BRIEF DESCRIPTION OF THE FIGURES

In the figures, like reference numerals refer to the same figure elements.

DETAILED DESCRIPTION

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient address translation in a network interface controller (NIC). The NIC allows a host to communicate with a data-driven network. The network can accommodate dynamic data traffic with fast, effective congestion control by maintaining state information of individual packet streams. More specifically, packets injected into the network of switches can be categorized into streams, which can be mapped to their layer-2, layer-3, or other protocol-specific header information. Each stream can be marked by a distinctive identifier that is local to an input port of a switch, and provided with a stream-specific input buffer so that each stream can be individually flow-controlled. In addition, packets of a respective stream can be acknowledged upon reaching the egress point of the network, and the acknowledgment packets can be sent back to the ingress point of the stream along the same data path in the reverse direction. As a result, each switch can obtain state information of active packet streams it is forwarding and can perform highly responsive, stream-specific flow control. Such flow control can allow the network to operate at higher capacity while providing versatile traffic-engineering capabilities.

The embodiments described herein solve the problem of inefficient address translation caused by unused pre-fetched translation by (i) dynamically allocating an address translation mode based on the current load on the address translation process, and (ii) based on the mode, switching between local and host-based address translation processes.

During operation, an application, which may run on a host computing device of a NIC, can generate a data operation (e.g., a "GET" or a "PUT" command of remote direct memory access (RDMA)) for a memory location of a remote device. The operation may represent the remote memory location using a virtual address. The operation, such as a read or a write, is usually performed on data at the location indicated by the virtual address. Such a remote memory reference can require an address translation from the virtual address to a physical address of the remote device.

When an application performs operations on a memory location, the operations are often directed to sequential memory locations. For example, when an operation of the application accesses a memory location, subsequent operations may access adjacent memory locations. As a result, the operations may move sequentially in memory. To utilize this feature, the address translation process can pre-fetch address translations for the adjacent memory locations. However, some applications may not access memory locations sequentially. For such circumstances, pre-fetching the address translations can cause inefficient bandwidth utilization of a host interface. For instance, if the NIC is coupled to the host via a peripheral component interconnect express (PCIe) interface, unused pre-fetching may lead to inefficient utilization of the PCIe bandwidth.

To solve this problem, the NIC can be equipped with an address translation unit (ATU) that may bypass pre-fetching of address translations upon meeting one or more criteria. The criteria can include one or more of: a combination (e.g., a summation) of a number of the outstanding address translation requests and a number of outstanding interface read requests being greater than an interface high watermark, and the number of the outstanding address translation requests being greater than an ATU high watermark. The ATU, thus, can prevent inefficient bandwidth utilization of the host interface. Typically, the ATU can operate in a "regular" mode that allows the ATU to pre-fetch address translations for a number of addresses in addition to a current address of interest. The ATU may select the addresses to pre-fetch based on a selection policy. Examples of the selection policy can include, but are not limited to, adjacent address selection, statistical or empirical data-based selection, and hotspot based selection.

The ATU can also operate based on a "bypass" mode that causes the ATU to refrain from performing address translation and defer the address translation to the host device (e.g., the processor of the host device). Upon receiving an address translation request from the application, the ATU can return the address back to the application without providing the translation. The ATU can include an indicator that indicates that the address has not been translated (e.g., by setting the address type to un-translated in the return message). The NIC can dynamically switch between the two modes.

In some embodiments, the NIC can determine when to switch between the two modes based on two sets of watermarks. The first set of watermarks can include a low watermark and a high watermark for a number of outstanding address translation requests. The second set of watermarks can include a high watermark for the total number of outstanding interface read requests (e.g., the PCIe read requests reported by the host interface). If the number of outstanding address translation requests falls below the low watermark, the NIC can switch to the regular mode. On the other hand, if a combination of the number of outstanding address translation requests and the total number of outstanding interface read requests crosses the interface high watermark, and the number of outstanding address translation requests crosses the address translation high watermark, the NIC can switch to the bypass mode. In this way, the NIC can determine whether the current translation requests are sequential requests and switch between the modes accordingly.

One embodiment of the present invention provides a NIC that can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available in the cache, the ATU can perform an operation on the memory address based on the operating mode.

In a variation on this embodiment, the operating mode is one of: (i) a regular mode that can cause the ATU to perform the memory address translation of the memory address, and (ii) a bypass mode that can cause the ATU to defer to the host device for the memory address translation of the memory address.

In a further variation, if the ATU is in the regular mode, the ATU can generate an address translation request for the memory address translation of the memory address and send the address translation request to an address translation service via the host interface.

In a further variation, the ATU can determine a set of additional memory addresses for pre-fetching based on the memory address, and incorporate the memory address and the set of additional memory addresses into the address translation request.

In a further variation, if the ATU is in the bypass mode, the ATU can send the memory address and an indicator via the host interface. The indicator can indicate that the memory address has not been translated.

In a further variation, the ATU can set the operating mode to the regular mode in response to a number of outstanding address translation requests being below a low watermark.

In a further variation, the ATU is to set the operating mode to the bypass mode in response to one or more of: (i) a combination of a number of outstanding address translation requests and a number of outstanding interface read requests being above a first high watermark, and (ii) the number of outstanding interface read requests being above a second high watermark.

In a further variation, the ATU can obtain the number of outstanding interface read requests from the host interface.

In a variation on this embodiment, the memory access request is a remote direct memory access (RDMA) command.

In a variation on this embodiment, the memory address can be a virtual memory address. The memory address translation can then provide a translation between the virtual memory address and a physical memory address.

Figure 1:
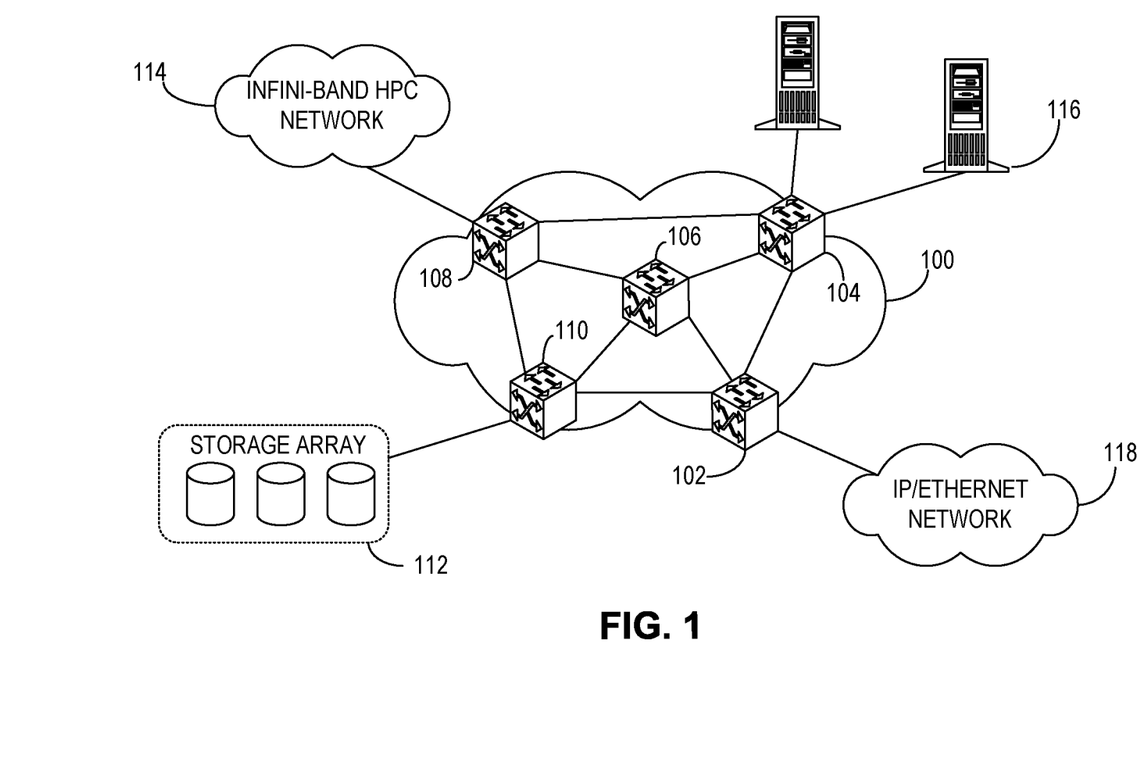
FIG. 1 shows an exemplary network.
Figure 2A:
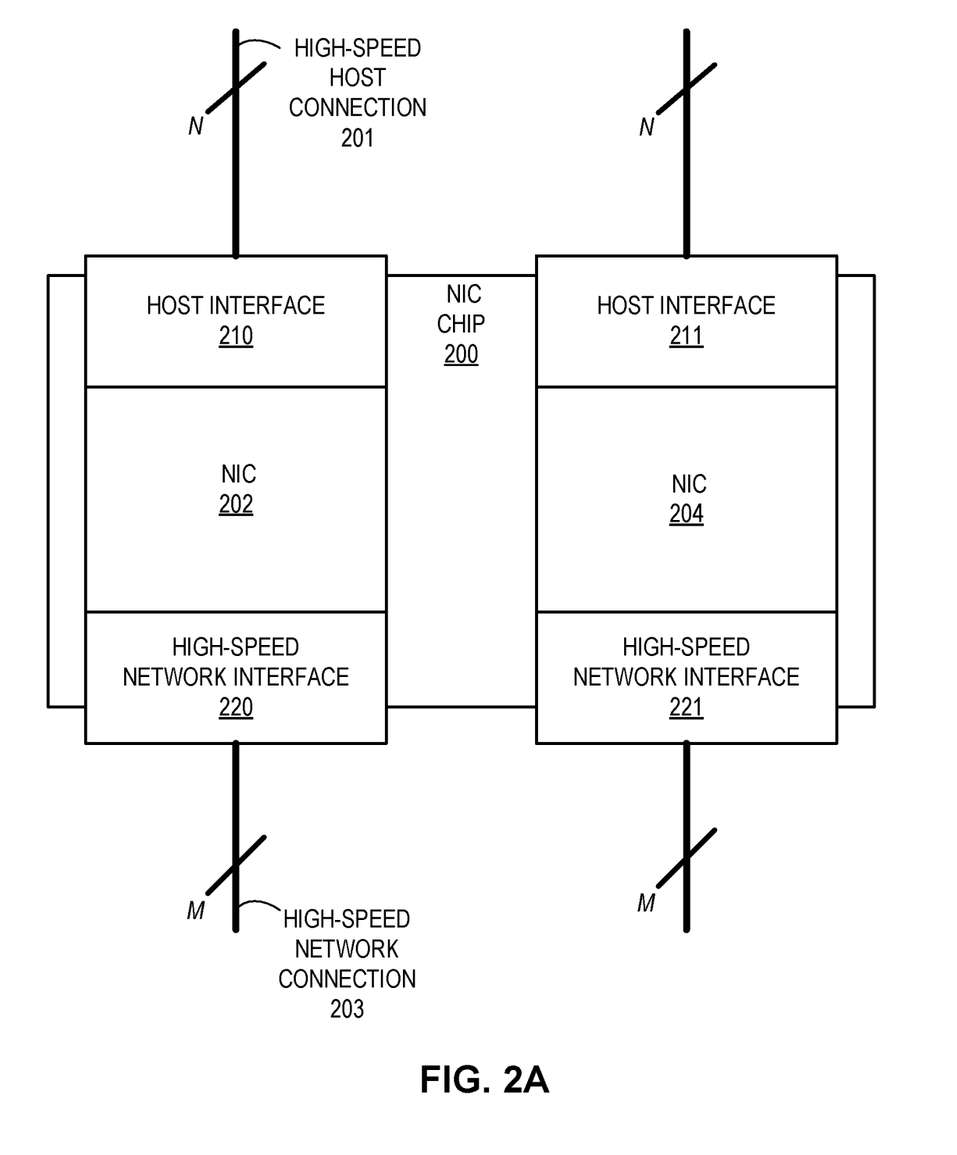
FIG. 2A shows an exemplary NIC chip with a plurality of NICs.

In this disclosure, the description in conjunction with FIG. 1 is associated with a network architecture and the description in conjunction with FIG. 2A and onward provide more details on the architecture and operations associated with a NIC that supports efficient memory address translation.

In this disclosure, packet streams can also be referred to as "packet flows," or simply "flows." The data path traversed by a flow, together with its configuration information maintained by switches, can be referred to as a "flow channel." Furthermore, the terms "buffer" and "queue" are used interchangeably in this disclosure.

FIG. 1 shows an exemplary network that facilitates flow channels. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, MC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (VIPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. MC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
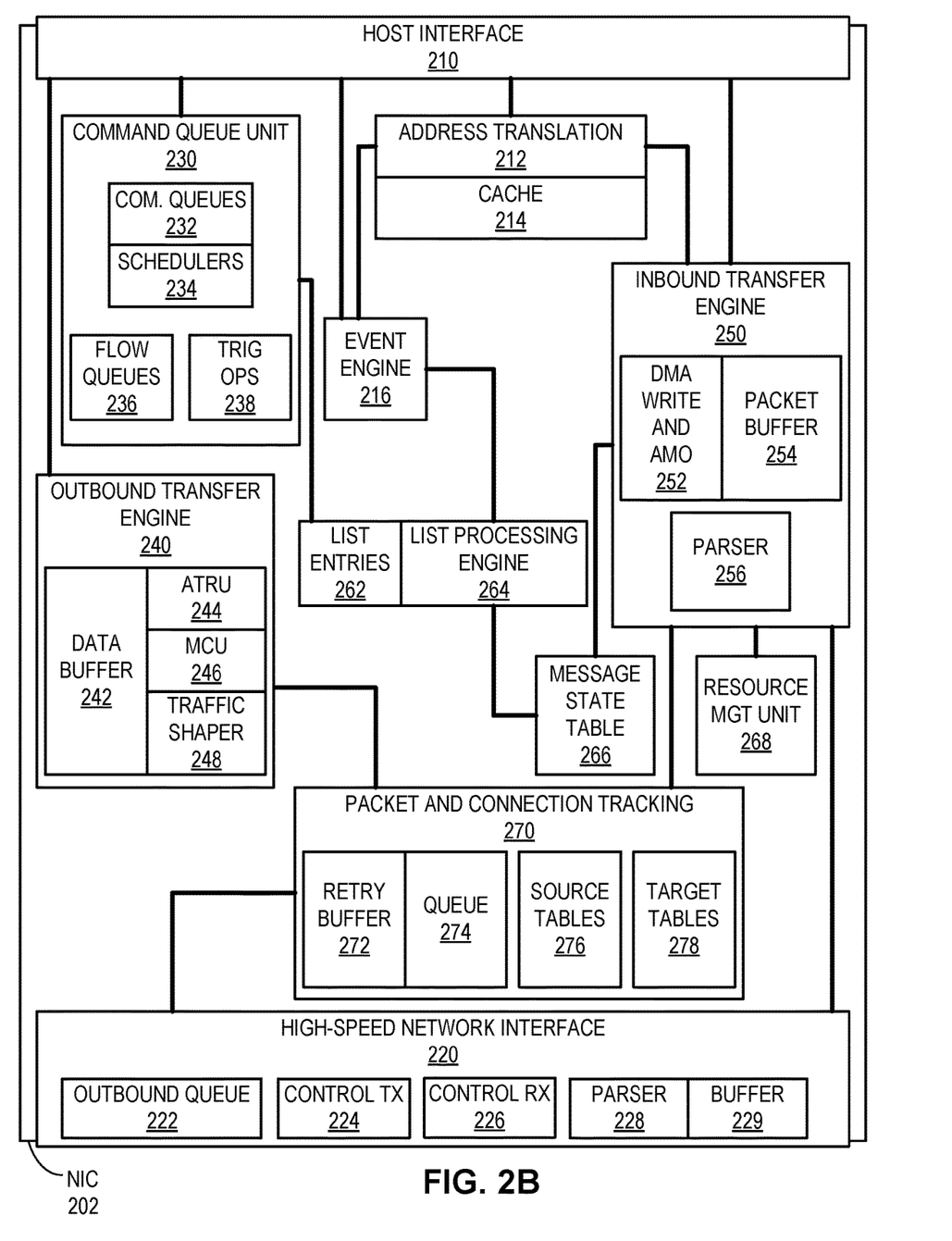
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Address Translation in NIC

Figure 3:
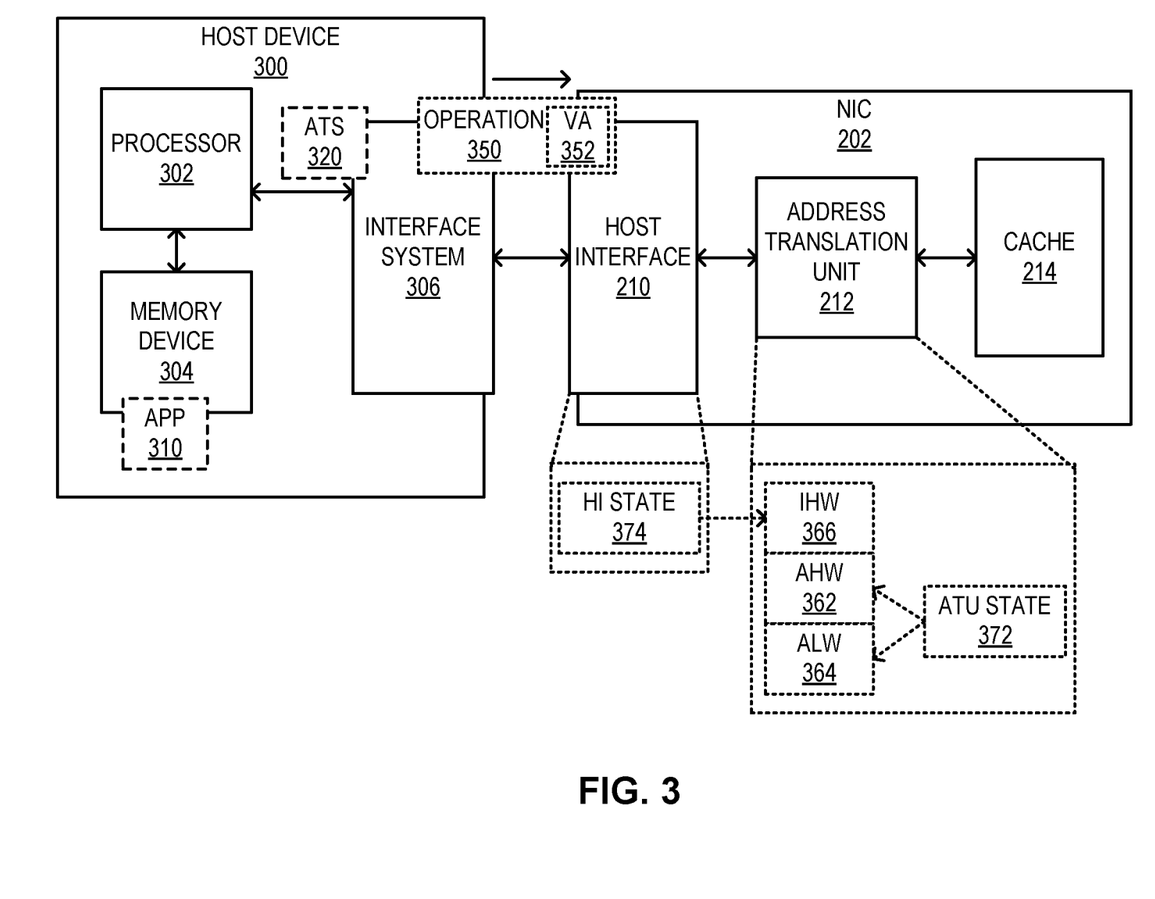
FIG. 3 shows exemplary efficient address translation in a NIC.

FIG. 3 shows exemplary efficient address translation in a NIC. In this example, NIC 202 can be coupled to a host device 300 via HI 210. Host device 300 can include a processor 302, a memory device 304, and an interface system 306. For example, if HI 210 is a PCIe interface, interface system 306 can be a PCIe system that provides a slot for HI 210. An application 310 can run on host device 300. During operation, application 310 can issue a memory access operation 350 for a virtual address 352. NIC 202 may expect that the subsequent requests from application 310 would be directed to sequential memory locations with respect to virtual address 352. To utilize this feature, ATU 212 can pre-fetch address translations for virtual address 352 as well as adjacent memory locations of virtual address 352. ATU 212 can then store the address translations in cache 214. However, if application 310 does not access memory locations sequentially, pre-fetching the address translations can cause inefficient bandwidth utilization of HI 210 (e.g., inefficient utilization of the PCIe bandwidth facilitated by interface connector 306).

To solve this problem, ATU 212 may bypass pre-fetching of address translations, if needed. Typically, ATU 212 can operate in a "regular" mode that allows ATU 212 to pre-fetch address translations for a number of addresses in addition to the current address of interest (i.e., virtual address 352). ATU 212 may select the addresses to pre-fetch based on a selection policy. Examples of the selection policy can include, but are not limited to, adjacent address selection (e.g., the addresses adjacent to virtual address 352), statistical or empirical data-based selection (e.g., the addresses typically accessed after accessing virtual address 352), and hotspot based selection (e.g., the most frequently accessed addresses close to virtual address 352).

In the regular mode, ATU 212 can obtain translations using address translation services (ATS) 320. ATS 320 can be a PCIe extension that allows NIC 202 to interact with an address translation agent in or above the root complex of interface system 306. Upon detecting a cache miss for virtual address 352 (i.e., a translation for virtual address 352 is not present in cache 214), ATU 212 can generate an ATS translation request and send the request via HI 210 to processor 302 to obtain the requested translation. Since the regular mode allows pre-fetching, ATU 212 can include translation requests for N addresses. This allows ATU 212 to fill the ATU cache line with the translation for virtual address 352 as well as (N−1) adjacent addresses that may become useful. For example, if the value of N is 8, ATU 212 can request address translation for virtual address 352 and 7 following addresses.

ATU 212 can also operate based on a "bypass" mode that allows ATU 212 to refrain from performing address translation and defer the address translation to host device 300. If ATU 212 is in the bypass mode, when NIC 202 receives operation 350, ATU 212 can return virtual address 352 back to application 310 without providing the translation. ATU 212 can include an indicator that indicates that virtual address 352 has not been translated. For example, ATU 212 can set the address type to un-translated (e.g., to a DEFAULT_UNTRANS type) in the return message. The bypass mode allows ATU 212 to operate without pre-fetching of address translations, thereby avoiding inefficient utilization of the bandwidth of HI 210.

To facilitate efficient address translation, NIC 202 can dynamically switch between the two modes. NIC 202 can determine when to switch between the modes based on two sets of watermarks. The first set of watermarks can include an ATU high watermark (AHW) 362 and an ATU low watermark (ALW) 364 for a number of outstanding address translation requests. The second set of watermarks can include an interface high watermark (IHW) 366 for the total number of outstanding interface read requests (e.g., PCIe read requests) reported by HI 210. In some embodiments, NIC 202 maintains the values of AHW 362, ALW 364, and IHW 366 in respective control and status register (CSR).

ATU 212 can determine an ATU state 372 indicating the number of outstanding address translation requests. ATU 212 can, for example, count of the total number of outstanding interface request from the ATU 212 to HI 210 to determine ATU state 372. HI 210 can maintain an HI state 374 indicating the total number of outstanding interface read requests. ATU 212 can obtain HI state 374 from HI 210. If ATU state 372 falls below ALW 364, NIC 202 can switch to the regular mode. On the other hand, if a combination of ATU state 372 and HI state 374 crosses IHW 366, and ATU state 372 crosses ATU state 372, NIC 202 can switch to the bypass mode. To make the switching decision, ATU 212 can compare ATU state 372 with AHW 362 and ALW 364 stored in the respective CSRs. Similarly, ATU 212 can compare HI state 374 with IHW 366 stored in the corresponding CSR.

Figure 4A:
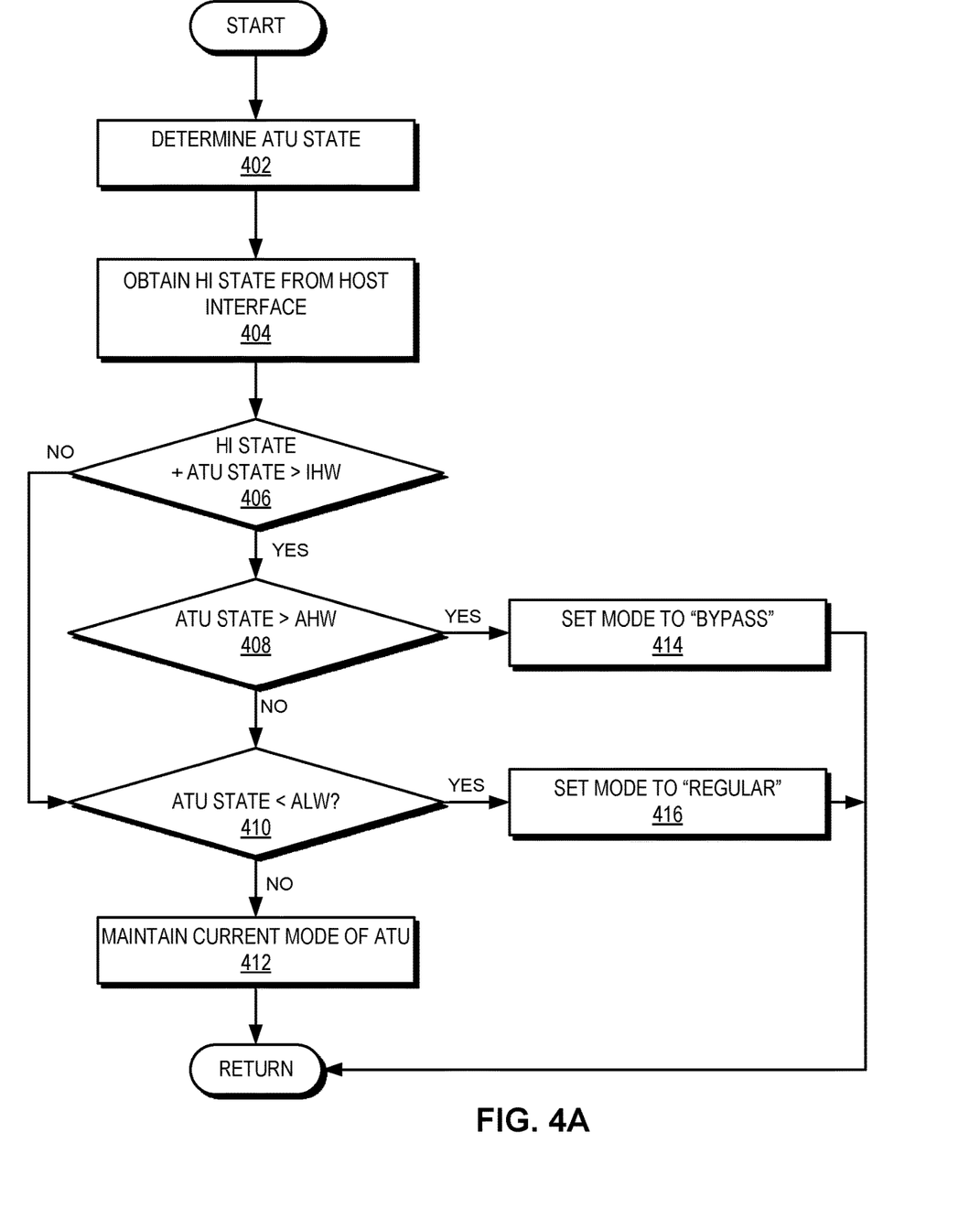
FIG. 4A shows a flow chart of an exemplary mode setting process for address translation in a NIC.

FIG. 4A shows a flow chart of an exemplary mode setting process for address translation in a NIC. During operation, an ATU of the NIC can determine the ATU state (operation 402) and obtain the HI state from the host interface (operation 404). The ATU can then determine whether a combination, such as a summation, of the HI state and the ATU state is above the IHW (operation 406). If the states are above the IHW, ATU can determine whether the ATU state is above the AHW (operation 408). If the ATU state is above the AHW, the ATU can set the mode as "bypass" (operation 414). If the states are not above the IHW (operation 406) or the ATU state is not above the AHW (operation 408), the ATU can determine whether the ATU state is below the ALW (operation 410). If the ATU state is below the ALW, the ATU can set the mode as "regular" (operation 416). If the ATU state is below the ALW (operation 410), the ATU can maintain the current mode of the ATU (operation 412).

Figure 4B:
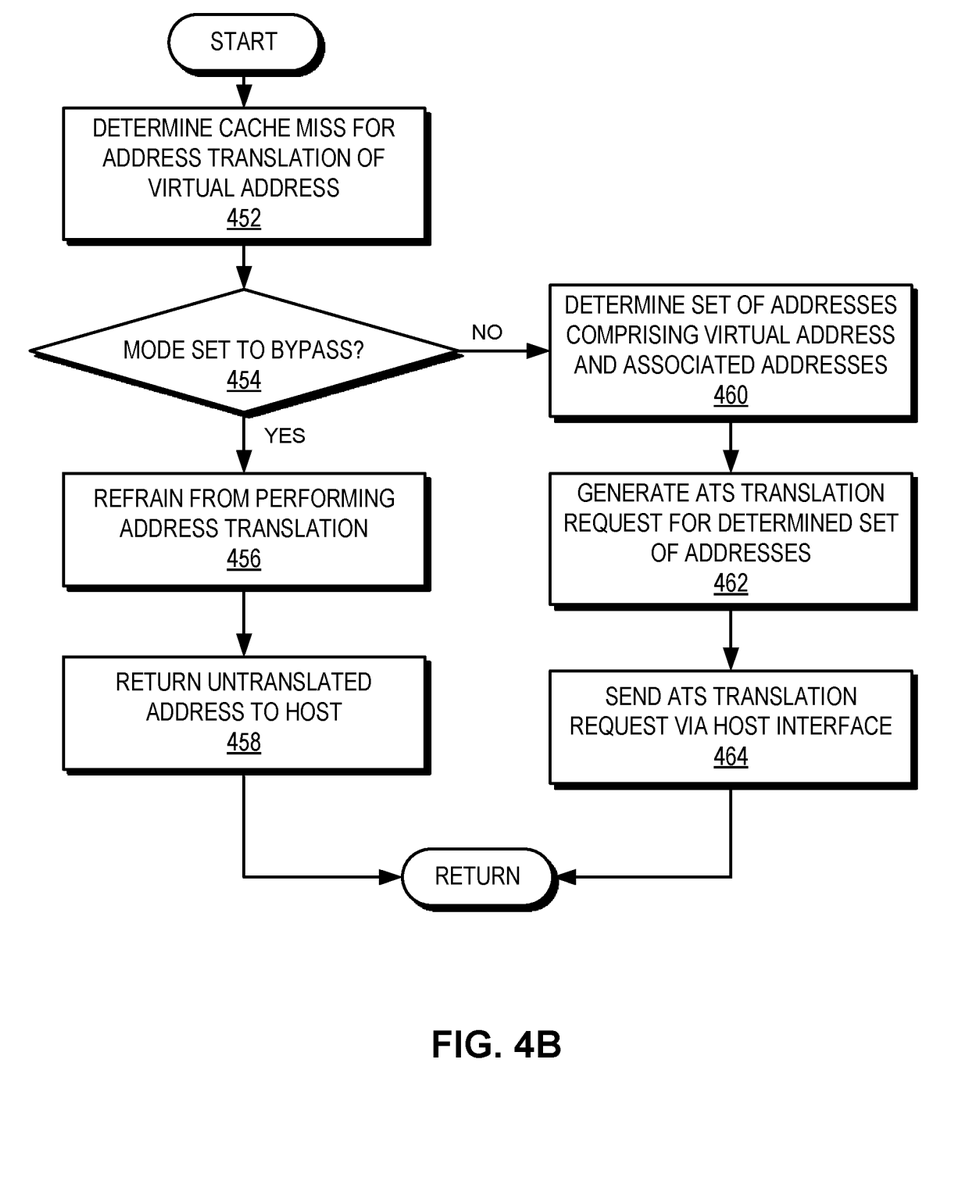
FIG. 4B shows a flow chart of an exemplary address translation process in a NIC.

FIG. 4B shows a flow chart of an exemplary address translation process in a NIC. During operation, an ATU of the NIC can determine a cache miss for the address translation of a virtual address (operation 452). The virtual address can be for a memory access request from a host. The ATU can then determine whether a mode of the ATU is set to bypass (operation 454). If the mode is set to bypass, the ATU can refrain from performing an address translation (operation 456) and return the untranslated address to the host (operation 458). On the other hand, if the mode is not set to bypass, the mode can be set to regular. Consequently, the ATU can determine a set of addresses comprising the virtual and a number of associated addresses (e.g., sequential addresses) (operation 460). The ATU can then generate an ATS translation request for the determined set of addresses (operation 462) and send the ATS translation request via the host interface (operation 464).

Exemplary Computer System

Figure 5:
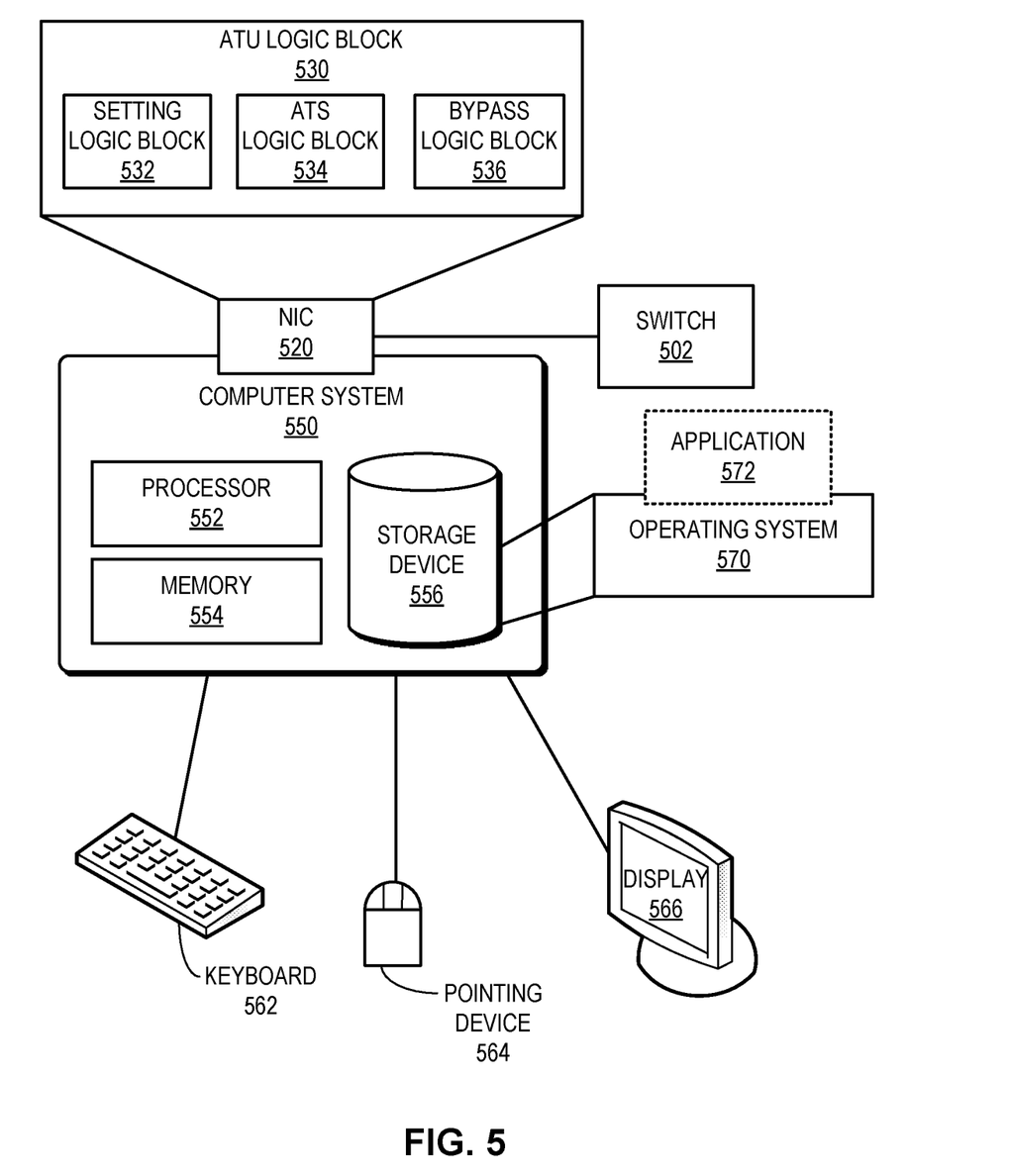
FIG. 5 shows an exemplary computer system equipped with a NIC that facilitates efficient address translation.

FIG. 5 shows an exemplary computer system equipped with a NIC that facilitates efficient address translation. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an ATU logic block 530, as described in conjunction with FIGS. 2B and 3. ATU logic block 530 can include a setting logic block 532 that can determine the mode for ATU logic block 530. ATU logic block 530 can also include an ATS logic block 534 that can facilitate address translation when ATU 530 is in the regular mode. ATS logic block 534 can send an address translation request for an address of interest and a set of pre-fetch addresses to an ATS service of computer system 550. The address of interest can be a virtual address indicated in a memory access request from application 572. On the other hand, bypass logic block 536 of ATU logic block 530 operates when ATU 530 is in the bypass mode. Bypass logic block 536 can send back an address of interest without performing the translation via the host interface.

In summary, the present disclosure describes a NIC that facilitates efficient memory address translation. The NIC can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available in the cache, the ATU can perform an operation on the memory address based on the operating mode.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
a host interface to receive a memory access request from a host device;
a cache for storing resolved memory address translations; and
an address translation unit (ATU) to:
determine an operating mode for the ATU, wherein the operating mode is one of:
a regular mode that causes the ATU to perform the memory address translation of the memory address; and
a bypass mode that causes the ATU to defer to the host device for the memory address translation of the memory address;
determine whether a memory address indicated in the memory access request is available in the cache; and
in response to the memory address not being available in the cache, perform an operation on the memory address based on the operating mode of the ATU,
wherein in response to the ATU being in the regular mode, the ATU is to:
generate an address translation request for the memory address translation of the memory address; and
send the address translation request to an address translation service via the host interface.

2. The network interface controller of claim 1, wherein the ATU is to:
determine a set of additional memory addresses for pre-fetching based on the memory address; and
incorporate the memory address and the set of additional memory addresses into the address translation request.

3. The network interface controller of claim 1, wherein, in response to the ATU being in the bypass mode, the ATU is to send the memory address and an indicator via the host interface, wherein the indicator indicates that the memory address has not been translated.

4. The network interface controller of claim 1, wherein the ATU is to set the operating mode to the regular mode in response to a number of outstanding address translation requests being below a low watermark.

5. The network interface controller of claim 1, wherein the ATU is to set the operating mode to the bypass mode in response to one or more of:
a combination of a number of outstanding address translation requests and a number of outstanding interface read requests being above a first high watermark; and
the number of outstanding interface read requests being above a second high watermark.

6. The network interface controller of claim 5, wherein the ATU is to obtain the number of outstanding interface read requests from the host interface.

7. The network interface controller of claim 1, wherein the memory access request is a remote direct memory access (RDMA) command.

8. The network interface controller of claim 1, wherein the memory address is a virtual memory address, and wherein the memory address translation provides a translation between the virtual memory address and a physical memory address.

9. A method, comprising:
receiving, by network interface controller (NIC) via a host interface of the NIC, a memory access request from a host device;
storing, in a cache in the NIC, resolved memory address translations;
determining an operating mode for the NIC, wherein the operating mode is one of:
a regular mode that causes the ATU to perform the memory address translation of the memory address; and
a bypass mode that causes the ATU to defer to the host device for the memory address translation of the memory address;
determining whether a memory address indicated in the memory access request is available in the cache; and
in response to the memory address not being available in the cache, performing an operation on the memory address based on the operating mode of the NIC,
wherein, in response to the ATU being in the regular mode, the ATU is to:
generate an address translation request for the memory address translation of the memory address; and
send the address translation request to an address translation service via the host interface.

10. The method of claim 9, further comprising:
determining a set of additional memory addresses for pre-fetching based on the memory address; and
incorporating the memory address and the set of additional memory addresses into the address translation request.

11. The method of claim 9, wherein, in response to the NIC being in the bypass mode, the method further comprises sending the memory address and an indicator via the host interface, wherein the indicator indicates that the memory address has not been translated.

12. The method of claim 9, further comprising setting the operating mode to the regular mode in response to a number of outstanding address translation requests being below a low watermark.

13. The method of claim 9, further comprising setting the operating mode to the bypass mode in response to one or more of:
a combination of a number of outstanding address translation requests and a number of outstanding interface read requests being above a first high watermark; and
the number of outstanding interface read requests being above a second high watermark.

14. The method of claim 13, further comprising obtaining the number of outstanding interface read requests from the host interface.

15. The method of claim 9, wherein the memory access request is a remote direct memory access (RDMA) command.

16. The method of claim 9, wherein the memory address is a virtual memory address, and wherein the memory address translation provides a translation between the virtual memory address and a physical memory address.

* * * * *